United States Patent Office 3,235,507
Patented Feb. 15, 1966

3,235,507
NOVEL OXAZOLINE COMPOUNDS AND METHOD OF PREPARATION
Isidore Pollack, Westminster, and Frederick S. Kaveggia, Los Angeles, Calif., assignors to Purex Corporation, Ltd., Lakewood, Calif., a corporation of California
No Drawing. Filed July 3, 1962, Ser. No. 207,412
13 Claims. (Cl. 252—301.2)

This invention relates to a novel group of compounds, and is particularly concerned with a novel group of compounds containing the oxazoline or thiazoline ring, many of which have fluorescent properties, and to a method of preparation of these compounds.

Fluorescent dyes and chemicals are now widely used in many arts. Thus, for example, fluorescent dyes are employed as textile dyes and are also used in inks, paints, pigments, dye penetrants for inspection of the surface of objects, to detect cracks and flaws therein, and for coloring of metals. For some applications, the fluorescent dyes are required to be water soluble, while for others the dyes must be substantially insoluble in water and soluble in organic solvents. The most valuable types of fluorescent dyes are those which exhibit a bright fluorescence within the visible spectrum when excited by light of the proper wave length, e.g., ultraviolet or so-called "black light."

It is accordingly an object of the invention to provide a novel class of compounds, many of which possess fluorescent characteristics.

Another object is the provision of a class of compounds having a plurality of functional groups, such as hydroxy groups, capable of further reaction, e.g., to form polymeric materials.

A particular object of the invention is the provision of a group of novel compounds characterized by the presence therein of an oxazoline or thiazoline ring, the oxazoline derivatives particularly exhibiting bright fluorescence.

Still another object is to afford novel, essentially water soluble, fluorescent dyes having a bright yellow to blue fluorescent emission within the visible spectrum.

Yet another object is the provision of procedure for producing the compounds of the invention.

Other objects and advantages will appear hereinafter.

We have unexpectedly found that, by reacting at relatively high temperature an alkanol primary amine with a tricarboxylated compound of the group consisting of citric acid, aconitic acid, tricarballylic acid, and esters thereof, a cyclization reaction and usually also an amidation reaction occur, involving the carboxylic acid groups or the ester groups of the tricarboxylated compound, and the primary amino groups and hydroxy groups of the alkanolamine, to form an oxazoline type linkage, and usually also an amido linkage, between the alkanolamine and the tricarboxylated compound, splitting off water, or both water and an alcohol, in the reaction, and resulting in a novel and valuable class of generally water soluble compounds, certain of which particularly exhibit bright yellow to blue fluorescence when excited by ultraviolet light.

From presently available data, and as will be pointed out more fully below, it is also believed that two molecules of the tricarboxylated compound are linked together by one molecule of alkanolamine through formation of an amide linkage and an ester linkage.

A similar reaction can take place at elevated temperatures, employing a thioalkanol primary amine (i.e., a mercapto primary amine) for reaction with a tricarboxylated compound as defined above, to form compounds containing a thiazoline linkage and which also may contain amide linkages and a thioester linkage. In this reaction, $H_2S$ will be formed.

The compounds produced according to the invention are of the general type represented by the formula:

(I) 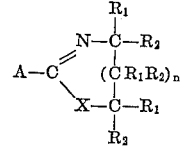

wherein X is a member of the group consisting of oxygen and sulfur, preferably oxygen; A is a member of the group consisting of a decarboxylated citric acid radical, a decarboxylated aconitic acid radical, a decarboxylated tricarballylic acid radical, and the corresponding decarboxylated ester radicals, e.g., a decarboxylated citric acid ester radical, a decarboxylated aconitic acid ester radical, or a decarboxylated tricarballylic acid ester radical, and from which at least one carboxylic group has been removed; $R_1$ and $R_2$ are each hydrogen, an alkyl radical, e.g., containing from 1 to about 22, preferably about 1 to about 12, carbon atoms, such as methyl, ethyl, propyl, isopropyl, butyl, amyl, octyl, nonyl, decyl, undecyl, duodecyl, and the like, and including cycloalkyl, e.g., cyclopentyl, cyclohexyl, and the like; an aryl radical, either monocyclic or polycyclic, such as phenyl, naphthyl, and the like; or alkaryl or aralkyl, such as methyl phenyl or ethyl phenyl, tolyl, phenyl ethyl, and the like; and wherein said alkyl, aryl, alkaryl and aralkyl substituents can be further substituted, e.g., by sulfonic acid groups, hydroxy groups, and the like; and wherein $R_1$ and $R_2$ may be the same or different; and $n$ is an integer from 0 to 2, preferably 0.

As will be pointed out more fully below, it is believed that usually only one of the carboxylic groups in each molecule of the tricarboxylated compound, that is, citric, aconitic or tricarballylic acid, or the esters thereof, reacts with the alkanolamine or thioalkanolamine to form the above-noted oxazoline or thiazoline type ring, so that under these conditions only one of the three carboxylic groups of the above tricarboxylated compound is replaced by such ring.

As previously noted, amidation of at least one of the other two carboxylic groups of the above tricarboxylated compound also takes place in the reaction, to produce a structure having the general formula:

(II) 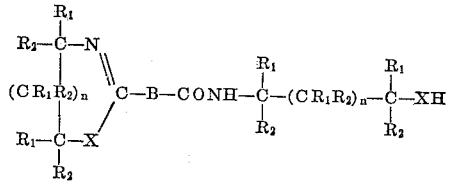

wherein B is a member of the group consisting of a decarboxylated citric acid radical, a decarboxylated aconitic acid radical, a decarboxylated tricarballylic acid radical, and the corresponding decarboxylated ester radicals, and from which at least two carboxylic groups have been removed; and X, $R_1$, $R_2$ and $n$ have the values above noted, X being preferably oxygen.

As previously indicated, it is further believed from experimental and analytical data that two molecules of the tricarboxylated compound, citric, aconitic or tricarballylic acid, or their esters, are linked together by an alkanolamine or thioalkanolamine residue through an amide and an ester linkage, as result of reaction of the primary amino group of one molecule of the alkanolamine or thioalkanolamine with one carboxylic group on the first molecule of the tricarboxylated compound, and reaction of the hydroxyl or mercapto group of such alkanolamine or thioalkanolamine molecule, with a carboxylic group on the second molecule of the tricarboxylated compound. The resulting reaction product is thus believed to have the following general formula:

(III)

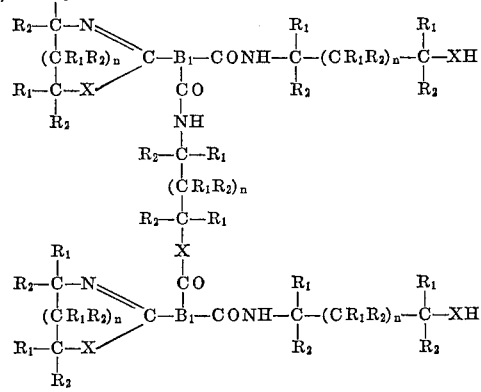

wherein $B_1$ is a member of the group consisting of a decarboxylated citric acid radical, a decarboxylated aconitic acid radical, and a decarboxylated tricarballylic acid radical, from which all three carboxyl groups have been removed; and X, $R_1$, $R_2$ and $n$ have the values above defined, X being preferably oxygen.

The preferred compounds of the invention, accordingly, are oxazoline or thiazoline-amide-esters of citric acid, aconitic acid, tricarballylic acid, or the esters thereof. The most desirable compounds, according to the invention, are the 1,3 oxazoline compounds of the formula below, wherein X in Formula III is oxygen and $n$ is 0.

(IV)

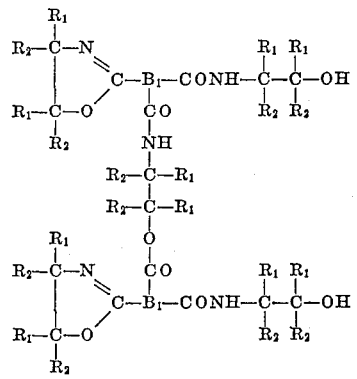

wherein $B_1$, $R_1$ and $R_2$ have the values above defined.

The following are some specific examples of novel compounds, according to the invention:

(a) 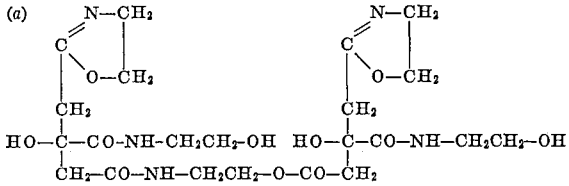

(b) 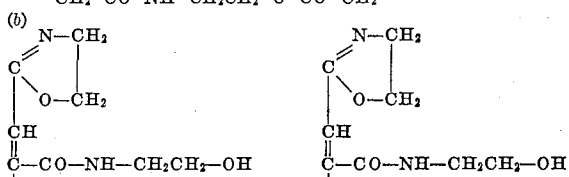

(c) 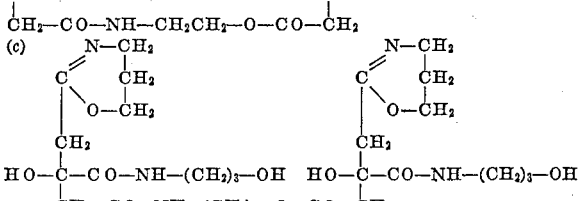

(d) 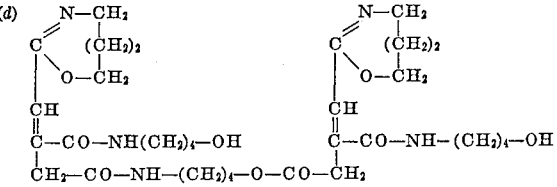

(e) 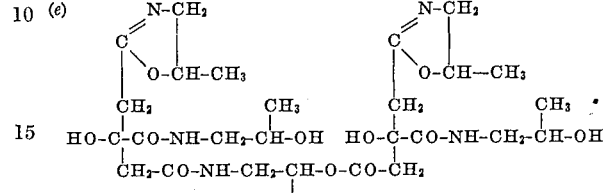

(f) 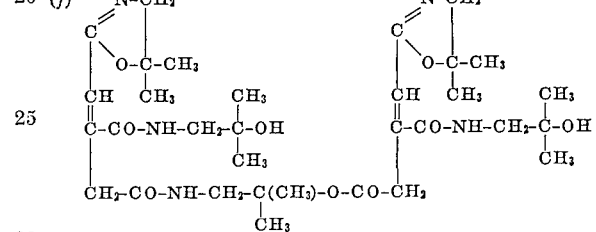

(g) 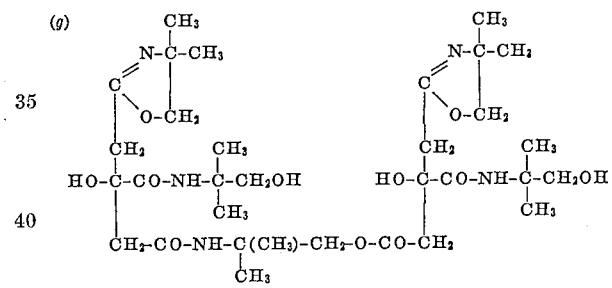

(h) 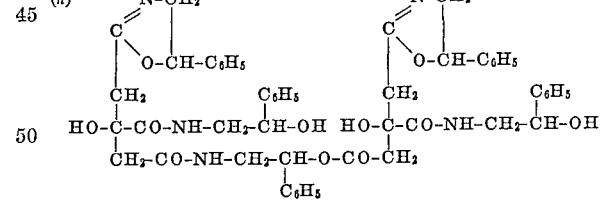

(i) 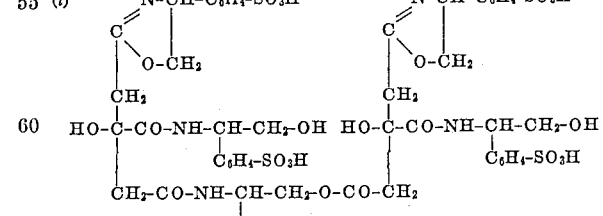

(j) 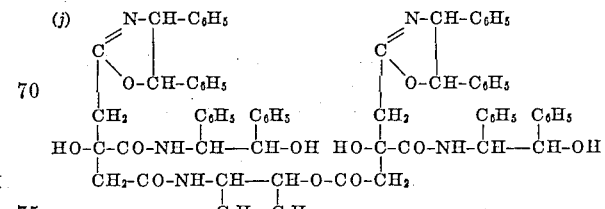

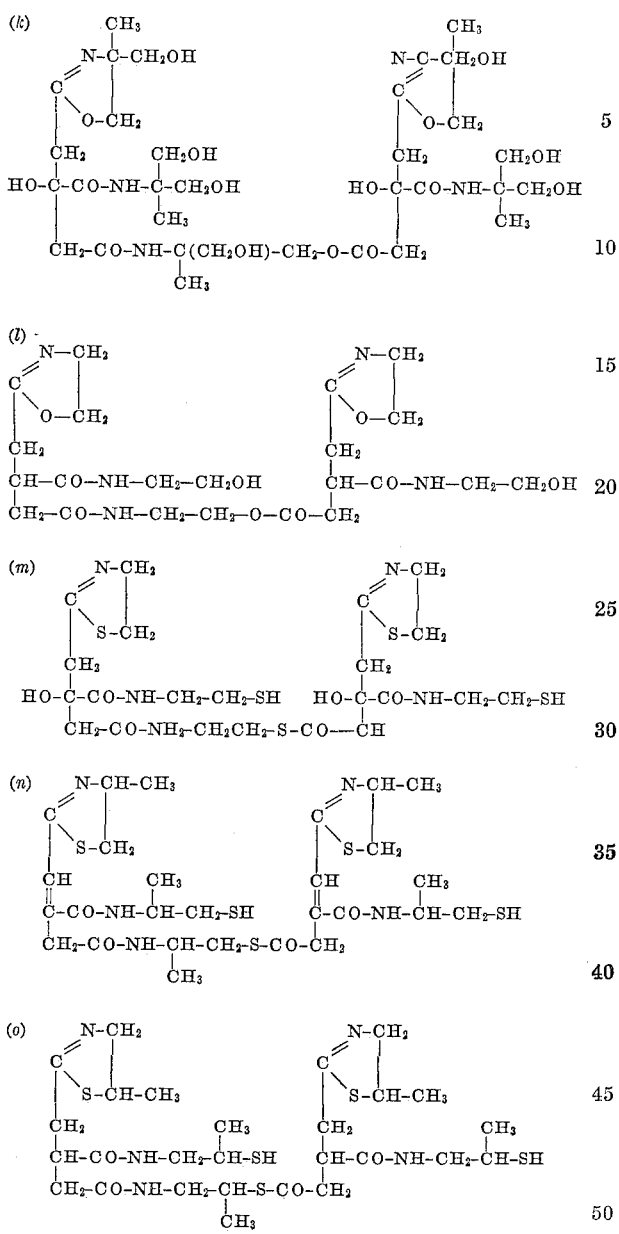

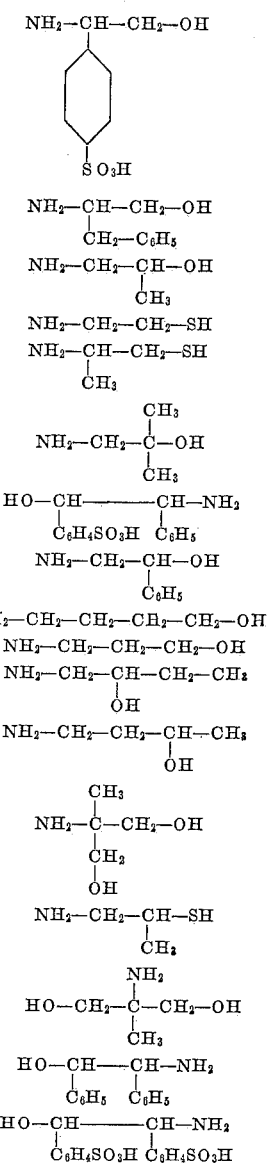

The structures of the compounds produced according to the invention have been established and confirmed by laboratory analysis, including molecular weight determinations, and infra-red and ultra-violet absorption spectra of the products.

Alkanolamines and thioalkanolamines which can be reacted with the above tricarboxylated compound for producing the compounds hereof have the general formula:

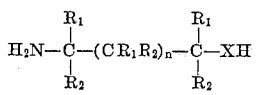

where X, $R_1$, $R_2$ and $n$ have the values above defined.

Examples of alkanolamines and thioalkanolamines which can be employed in the reaction with citric, aconitic or tricarballylic acid, or their esters, to produce the reaction products or novel compounds of the invention are the primary alkanolamines such as the following:

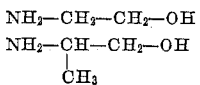

As the tricarboxylated reactant, the tricarboxylic acids, citric acids, aconitic acid, tricarballylic acid, or their substituted derivatives, are suitable. Substituted citric, aconitic or tricarballylic acids which can be employed may be, for example, the alkyl, e.g., methyl, ethyl, propyl, and the like, derivatives, and the aryl, e.g., phenyl and naphthyl, derivatives of citric acid, aconitic acid, or tricarballylic acid.

The esters, e.g., the alkyl esters, of citric acid, of aconitic acid, or of tricarballylic acid, or their substituted derivatives, may also be employed. These are generally in the form of triesters, although mixed acid-esters may be employed such as the diesters of citric, aconitic and tricarballylic acids. Thus, for example, triethyl citrate, triethyl aconitate or triethyl carballylate can be employed, and diethyl citrate, diethyl aconitate and diethyl carballylate may also be suitable. The corresponding methyl, propyl and butyl esters can also be used. Substituted citric, aconitic or tricarballylic acid esters which may be employed include the alkyl, e.g., methyl, ethyl, propyl, and the like, derivatives, and the aryl, e.g., phenyl and naphthyl derivatives, of citric acid ester, aconitic acid ester, or tricarballylic acid ester.

The terms "a citric acid", "a citric acid ester", "an aconitic acid", "an aconitic acid ester", "a tricarballylic acid", and "a tricarballylic acid ester", as employed herein, are intended to denote either the unsubstituted or the substituted acids and esters. The preferred tricarboxylated compounds are the unsubstituted citric acid, aconitic acid, and tricarballylic acid, and their unsubstituted triesters.

The reaction between the amine and the tricarboxylated compound is carried out by forming a mixture of the amine and the tricarboxylic acid or ester in the desired molar proportions, as described more fully below. The mixture is then stirred while low heat is applied over a period of, say, 15 to 20 minutes, to form a melt. When a completely homogeneous melt is obtained, the application of heat is increased and the melt is rapidly heated to temperature in the range of about 325° to about 400° F., usually about 350° to about 375° F., until frothing occurs. The reaction mixture is further heated and maintained at temperatures in the above ranges for a period, e.g., about 10 to 20 minutes, until frothing ceases, indicating completion of the reaction. As will be apparent from the course of the reaction as illustrated below, water, or both water and alcohol, are formed as a result of amidation, cyclization or ring formation, and esterification, which can take place in the reaction.

When the reaction is completed, the reaction product is purified and separated from the reaction mixture by extracting the mixture, preferably with a solvent for the excess amine and in which the reaction product is insoluble, e.g., isopropyl alcohol or benzene, thus forming a solvent solution containing the excess amine, and removing such solvent solution, e.g., by decantation from the reaction mixture. The alcohol insoluble portion, containing water and residual organic solvent, is then heated to evaporate water and remaining solvent, and the residue comprising reaction product is then dried.

As an alternative to the above purification procedure, a solvent can be used in which the reaction product is soluble and the excess amine is insoluble, thus extracting a solvent solution of the product, and removing the solvent by distillation to recover the product.

Alternatively, the above-described solvent extractions can be omitted, and instead the reaction mixture can be subjected to vacuum distillation to drive off the amine, water, and alcohol, if present, followed by drying the reaction product residue.

The reaction products of the invention are generally soluble in water. However, where the reactants, e.g., the amine, carry aromatic substituents, e.g., 1,2-diphenyl ethanolamine, or relatively long chain alkyl substituents, e.g., containing about 4 or more carbon atoms, the reaction product may be soluble in organic solvents such as ketones, and insoluble in water. See Example 10 below.

Many of the invention compounds, particularly the oxazoline derivatives formed from a citric or an aconitic acid, or their esters, emit fluorescent light in the visible region of the spectrum when either the solid product or a solution thereof is subjected to an activating or exciting wave length of light, usually in the invisible portion of the spectrum, by irradiation with "black light" or ultraviolet light. The fluoroscent emission of the products in solid form may be different than the fluoroscent emission of the same product in solution, that is, a different color fluorescence may be obtained under these two conditions.

The compounds of the invention are produced employing a molor proportion of at least 1 mol of the amine, e.g., alkanolamine, per mol of the tricarboxylated compound. The preferred products, having the general Formula III or IV above, are prepared by employing in the condensation reaction at least 6, and usually between 6 and 8, mols of the amine, e.g., alkanolamine such as ethanolamine, per 2 mols of a citric acid, an aconitic acid, or a tricarballylic acid, or their respective esters (i.e., at least a 3:1 molar ratio of amine to such tricarboxylated compounds). Molar proportions of amine such as alkanolamine, greater than 8 mols, e.g., up to 14 mols, per 2 mols of a citric acid, an aconitic acid, or a tricarballylic acid compound, or their esters, can be employed to produce preferred compounds having the structure of Formula III or IV above, except that care must be taken to remove as much of the excess amine as possible from the reaction mixture, as the presence of such excess amine in the product may reduce the brightness of the fluoroescent emission from the product.

However, it will be noted that, although only 5 mols of the amine, e.g., alkanolamine, react with each 2 mols of a citric acid, an aconitic acid, or a tricarballylic acid, or their respective esters, to form Compound III or IV above, it has been found that at least one mol of the amine in excess of such stoichiometric amount of 5 mols for each 2 mols of the above tricarboxylated compound is required in order to produce a product of the structure of formula III or IV, and represented by the specific Compounds $a$ to $o$ above. It is not known what the function of such excess amine is in the reaction, that is, whether it acts as a catalyst or in some other manner to facilitate formation of the reaction product.

Although preferred compounds are prepared by reacting the amine, e.g., alkanolamine, and a citric acid, an aconitic acid, or a tricarballylic acid, or their esters, in a molar proportion of from 3 to 4 mols of the amine per mol of the acid or ester, useful compounds can be prepared employing a molar proportion of less than 3, e.g., from 1 to about 2.5 mols of amine, e.g., alkanolamine, per mol of the acid or ester. Employing the above less preferred lower molar proportions of amine to tricarboxylated compound, it is believed that products are formed which, although not having the preferred structure illustrated in Formula III or IV, have the typical oxazoline or thiazoline ring structure linked to a decarboxylated citric, aconitic or tricarballylic acid radical, or their respective ester radicals, according to the general Formula I above, and which may also have an amide linkage, as illustrated by general Formula II above, if sufficient amine, e.g., alkanolamine, is employed to form both types of linkages. These reaction products are also contemplated within the purview of the invention.

Compounds formed particularly from reaction of alkanolamines and a citric or an aconitic acid, or their esters, according to the invention generally possess fluorescent properties. The fluorescent compounds or fluorescent dyes produced according to the invention may be used to color cotton or nylon. Thus, for example, such compounds, e.g., Compound $h$ above, can be sulfonated, e.g., on the aromatic nucleus, or a sulfonated reaction product formed from a sulfonated aromatic reactant, such as a sulfonated aryl substituted alkanolamine, e.g., Compound $i$ above. The provision of a sulfonated reaction product may render the dye substantive to cotton. In weakly acid baths, e.g., aqueous acetic or boric acid solutions, the fluorescent dyes of the invention are substantive to and can be exhausted on nylon and acrlian. In the presence of sodium tripolyphosphate, it has been found that a solution of the dye products of the invention is substantive to aluminum, and stains it a golden yellow color, and provides a protective coating on the aluminum.

Further, the fluorescent dyes of the invention can be employed in formulations useful for leak detection, in dye penetrants for detection of flaws in surfaces of bodies, in paints, e.g., water colors, and the like.

Certain of the compounds of the invention, e.g., those produced by reaction of the amines defined above with a tricarballylic acid, or its esters, and also those compounds produced employing thioalkanolamines, may not possess fluorescent properties. However, since these compounds, as well as those previously noted which are fluorescent, contain a plurality of free functional groups, e.g., two or more hydroxy or mercapto groups (see Formula III above), these compounds may serve as intermediates for further reaction or coupling with other compounds, to produce useful polymers or dyes. For example, the compounds of the invention may be reacted with a dicarboxylic acid, e.g., succinic or adipic acid, to produce polymeric compounds in the form of plastics, films or fibers.

The following are examples of preparation of the compounds or dyes of the invention, and their application.

*Example 1*

To 549 grams (9 gm.-moles) of ethanolamine, 576 grams of citric acid (3 gm.-moles) were added with stirring. The citric acid suspension was then slowly heated until a uniform dark brown melt was obtained. This melt was then rapidly heated to 370° F., at which point frothing occurred. The reaction product was then heated for an additional 10 minutes, after which no further reaction was obtained. This product was purified by successive extractions with isopropyl alcohol, which removed the excess ethanolamine. Approximately 1.5 gram mole of ethanolamine was removed from the reaction product by this extraction procedure. The residue, after drying in a vacuum dessicator, was examined under "block light" (3300–3900 A.) and found to be intensely fluorescent in its original hard brown resin-like state. It emitted fluorescent light in the visible region of the spectrum. To the eye, the fluorescent emission was greenish-yellow, emitting maximum fluorescence at about 5000 A. The product, hygroscopic in nature, appeared to dissolve in water almost instantly, imparting to a dilute solution an intense bluish fluorescence. Examined by Spectrophotofluorometer, the solution emitted maximum fluorescence at about 4600 A.

The dye formed had the structure of compound (a) above, having the empirical formula of $C_{22}H_{35}N_5O_{11}$. Analytical data obtained confirms the structure given.

|  | Laboratory analysis of purified product | Calculated values based upon $C_{22}H_{35}N_5O_{11}$ |
|---|---|---|
| Molecular weight | 548 | 545.6 |
| Carbon, percent | 48.5 | 48.4 |
| Hydrogen, percent | 6.4 | 6.5 |
| Nitrogen, percent | 12.2 | 12.8 |
| Oxygen (difference), percent | 32.9 | 32.3 |

Additionally, infra-red and ultra-violet absorption spectra obtained from the product confirm the structure described.

*Example 2*

300 grams of aconitic acid were reacted with 366 grams of ethanolamine under the same reaction conditions as Example 1. Purification was accomplished by means of vacuum distillation of the reaction mixture instead of by solvent extraction. The product obtained had fluorescent properties similar to the product obtained in Example 1, except that in its original state, this product had a less intense greenish-yellow appearance as compared to that of Example 1. In water solutions, the product gave similar fluorescent characteristics. The compound is believed to have the structural Formula (b) set forth above.

*Example 3*

38.4 grams of citric acid were added to 51.6 grams of 2-amino 2-methyl 1-propanol. This mixture was slowly heated until a uniform melt was obtained. The reaction mixture was then heated to 380° until frothing ceased. The resulting product was freed of excess ethanolamine by extraction with benzene. The product obtained was soluble in water, to which it imparted strong blue fluorescence. The structure of the product is believed to be that of Formula g above.

*Example 4*

The procedure of Example 1 is repeated, employing in place of ethanolamine each of the following alkanolamines in the same molar proportion of 3 mols of the alkanolamine per mol of citric acid, as in Example 1, and carrying out the reaction at temperatures ranging from about 350° to about 375° F.:

3-amino 1-propanol
2-amino 1-propanol
1-amino 2-propanol
1-amino 2-phenyl ethanol
1-amino 1-(benzene p-sulfonic acid) 2-ethanol
4-amino 1-butanol
t-Butanolamine.

Fluorescent reaction products are thereby obtained.

*Example 5*

The procedure of Example 2 is repeated, employing in place of ethanolamine each of the alkanolamines listed in Example 4, in a molar proportion of about 3.5 mols of the alkanolamine per mol of aconitic acid, at reaction temperatures of about 350° to about 375° F., to obtain fluorescent reaction products.

*Example 6*

The procedure of Example 1 is repeated, except employing 366 grams (6 gm.-moles) of ethanolamine, or a mol ratio of 2 moles ethanolamine per mol of citric acid. The solid reaction product now has a blue, relatively weaker fluorescence than the strong yellow-green fluorescence of the solid product of Example 1.

This example shows that the use of a molar ratio outside the preferred molar ratio range of between about 3 and about 4 mols of alkanolamine, e.g., ethanolamine, per mol of citric acid, produces dyes of less intense fluorescence than when employing the above-noted preferred range of molar ratios.

*Example 7*

The procedure of Example 1 is repeated, except employing 1,098 grams (18 gm.-moles) of ethanolamine, or a mol ratio of 6 mols ethanolamine per mol of citric acid. A dye having fluorescent characteristics similar to but less intense than the dye of Example 1 is obtainable.

*Example 8*

27.6 grams of triethyl citrate were mixed intimately with 18.3 grams of monoethanolamine. (This was a 1:3 mole ratio of triethyl citrate to ethanolamine.) The mixture was stirred for ½ hour while heating to about 360° F. After this period the mixture began to froth. The temperature rose to 390° F. When the reaction was completed, the mass was cooled and vacuum distilled to remove excess ethanolamine. The final purified product, Compound a above, was strongly fluorescent; equal to the product obtained by reacting citric acid with ethanolamine in Example 1.

*Example 9*

The procedure of Example 8 is repeated employing, in place of the triethyl citrate, the triethyl ester of aconitic acid, to obtain Compound b above, having strong fluorescence characteristics.

*Example 10*

The procedure of Example 1 is repeated, employing 1,2-diphenyl ethanolamine instead of ethanolamine. The product obtained is represented by Formula j above. Such product had a bright orange fluorescence when excited by "black light." The dye was insoluble in water, and in methyl ethyl ketone it forms a solution or dispersion having a blue fluorescence.

Example 11

The fluorescent dye of Formula *k* above is employed for coloring nylon by first forming a treating bath having the following composition:

| | Percent by weight |
|---|---|
| Nacconol NRSF (about 90% sodium alkylaryl sulfonate having an average of 12 carbon atoms in the alkyl chain and about 10% sodium sulfate) | 0.1 |
| Flourescent dye—Compound *k* | 0.1 |
| Water | 99.8 |
| | 100.0 |

The pH of the bath is adjusted to 3.0 with formic acid, and nylon cloth is immersed in the bath maintained at about 140° F., for 10 minutes. It is then thoroughly rinsed and dried. The treatment imparts to it very strong blue fluorescense under black light.

Example 12

A nylon (polyamide) material marketed as "Zytel 61 Nylon Resin" soluble in alcohol, was dissolved in hot ethyl alcohol to form a 10% solution by weight of the nylon material. To this solution was added the fluorescent Compound *a* above in a concentration of 0.5% of the compound by weight of the solution.

The alcohol was allowed to evaporate from the resulting solution at room temperature (about 72° F.). On evaporation of the alcohol, a hard resinous material remained, which emitted a bright blue-green fluorescence under ultraviolet light.

This example indicates application of the fluorescent dyes of the invention in nylon spinning solutions to produce fluorescent nylon thread.

Example 13

Using about 35 grams tricarballylic acid (0.2 mol) and 37 grams ethanolamine (0.6 mol), these reactants were intimately mixed and heated to about 350° F. until frothing ceased, indicating completion of the reaction. Excess ethanolamine may be removed by vacuum distillation or by solvent extraction. A product was obtained having the structure of compound *l* above.

Example 14

19 grams of citric acid (0.1 mol) may be reacted with 23 grams of thioethanolamine (0.3 mol) by mixing the reactants together intimately and heating to about 350° to about 370° F. Excess amine may be removed by vacuum distillation, and traces of H₂S evolved may be removed by air blowing. A reaction product having the structure of compound *m* above is thereby obtainable.

From the foregoing, it is apparent that the invention provides a new class of compounds having valuable properties, particularly as fluorescent dyes, and to a process for preparing such compounds readily.

While we have described particular embodiments of our invention for purposes of illustration, it should be understood that various modifications and adaptations thereof may be made within the spirit of the invention, as set forth in the appended claims.

We claim:

1. A compound having the formula:

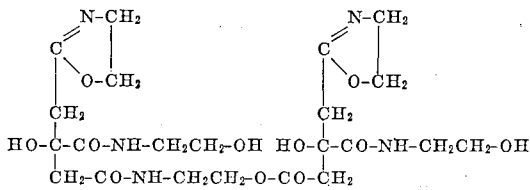

2. A compound having the formula:

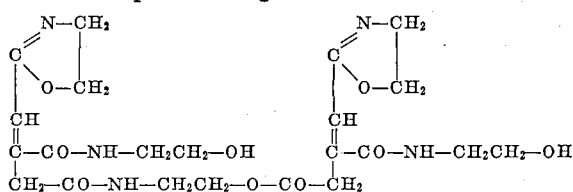

3. A compound having the formula:

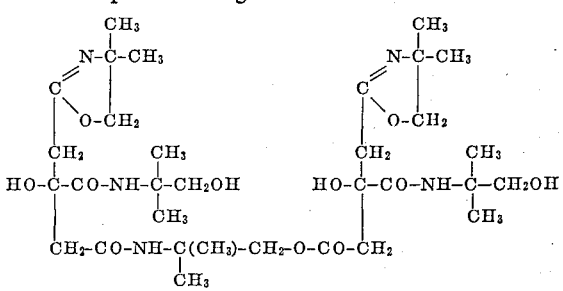

4. A compound having the formula:

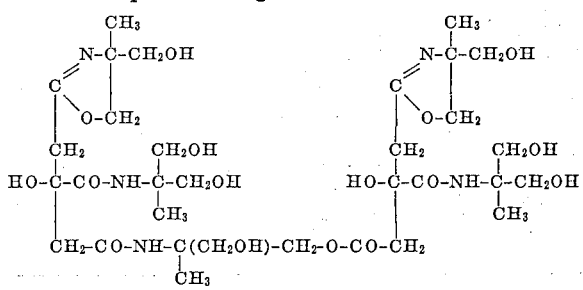

5. A compound having the formula:

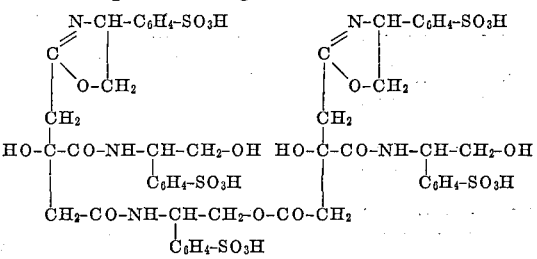

6. The process which comprises heating an amine of the group consisting of an alkanol primary amine and a thioalkanol primary amine with a tricarboxylated compound of the group consisting of a citric acid, an aconitic acid, a tricarballylic acid, and the esters thereof, in a molar ratio of at least one mol of the amine per mol of the tricarboxylated compound to form a melt, raising the temperature of the reaction mixture in the range of about 325° to about 400° F. until frothing occurs, and maintaining the reaction mixture in the aforementioned range for a period until frothing ceases.

7. The process as defined in claim 6, employing a molar ratio of the amine to the tricarboxylated compound of at least 3:1.

8. The process which comprises heating an alkanol primary amine with a tricarboxylated compound of the group consisting of a citric acid, an aconitic acid, a tricarballylic acid, and the esters thereof, in a molar ratio of the amine to the tricarboxylated compound of from about 3:1 to about 4:1, to form a melt, raising the temperature of the reaction mixture in the range of about 350 to about 375° F. until frothing occurs, maintaining the temperature in the aforementioned range for a period until frothing ceases, removing excess amine, and recovering the reaction product.

9. The process as defined in claim 6, wherein said amine is ethanolamine.

10. The process which comprises heating ethanolamine and citric acid in a molar ratio of the amine to the acid of from about 3:1 to about 4:1, to form a melt, raising the temperature of the mixture in the range of about 350 to about 375° F. until frothing occurs, continuing the reaction in the aforementioned temperature range until frothing of the reaction mixture substantially ceases, removing excess ethanolamine from the reaction mixture, and recovering the reaction product.

11. The process which comprises heating ethanolamine and aconitic acid in a molar ratio of the amine to the acid of from about 3:1 to about 4:1, to form a melt, raising the temperature of the mixture in the range of about 350 to about 375° F. until frothing occurs, continuing the reaction in the aforementioned temperature range until frothing of the reaction mixture substantially ceases, removing excess ethanolamine from the reaction mixture, and recovering the reaction product.

12. The process which comprises heating ethanolamine and triethyl citrate in a molar ratio of the amine to the ester of from about 3:1 to about 4:1, to form a melt, raising the temperature of the mixture in the range of about 350 to about 375° F. until frothing occurs, continuing the reaction in the aforementioned temperature range until frothing of the reaction mixture substantially ceases, removing excess ethanolamine from the reaction mixture, and recovering the reaction product.

13. As a dye composition of matter for coloring textile fibers, a weakly acid aqueous solution containing a minor amount of a compound as defined in claim 1.

References Cited by the Examiner
UNITED STATES PATENTS 2,402,791  6/1946  Wampner _____ 260—307.6

OTHER REFERENCES

Elderfield, Heterocyclic Compounds, vol. 5 (New York, 1957), pages 380–1.

Fieser et al., Advanced Organic Chemistry (New York, 1961), pages 640–674 and 904–928.

NICHOLAS S. RIZZO, *Primary Examiner.*

WALTER A. MODANCE, *Examiner.*